United States Patent [19]

Ishikawa et al.

[11] 4,057,334
[45] Nov. 8, 1977

[54] SELF TIMER DEVICE FOR MOTION PICTURE CAMERA

[75] Inventors: Kazuo Ishikawa; Noritsugu Hirata, both of Yokohama; Tomoshi Takigawa, Machida; Yasutsugu Yamada, Kawasaki, all of Japan

[73] Assignee: Canon Kabushiki Kaisha, Tokyo, Japan

[21] Appl. No.: 664,364

[22] Filed: Mar. 5, 1976

[30] Foreign Application Priority Data

Mar. 11, 1975 Japan .................................. 50-29297

[51] Int. Cl.$^2$ ............................................. G03B 1/00
[52] U.S. Cl. .................................... 352/175; 242/208
[58] Field of Search ................. 352/174, 175; 242/208

[56] References Cited

U.S. PATENT DOCUMENTS

| 3,027,800 | 4/1962 | Leuschke | 352/175 |
| 3,056,334 | 10/1962 | Christensen | 352/175 |
| 3,238,008 | 1/1966 | Krumbein | 352/175 |

Primary Examiner—Monroe H. Hayes
Attorney, Agent, or Firm—Toren, McGeady and Stanger

[57] ABSTRACT

The present invention relates to a self-timer device for a motion picture camera which presents a second motor switch connected in series with the first motor switch to be closed by means of the release means at the time of the camera release, the first timer means including a governer mechanism for actually starting photographing, closing the second motor switch after the elapse of a certain determined time from the automatic photographing setting and the second timer means for stopping the camera release after the elapse of a certain determined time from the actual starting of photographing, so as to open the first motor switch and terminate the photographing. In this manner the first timer means is driven by means of a spring means as a driving source while the second timer means is driven by means of the camera driving motor as driving source and controls the timing of the start and stop of the photographing at the time of the automatic photographing.

26 Claims, 15 Drawing Figures

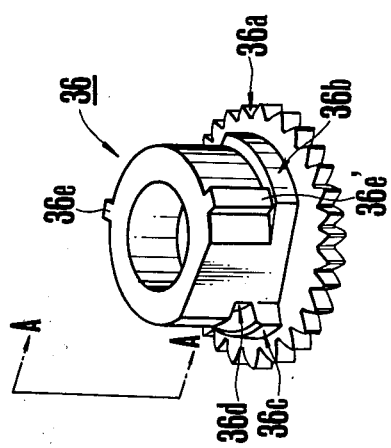
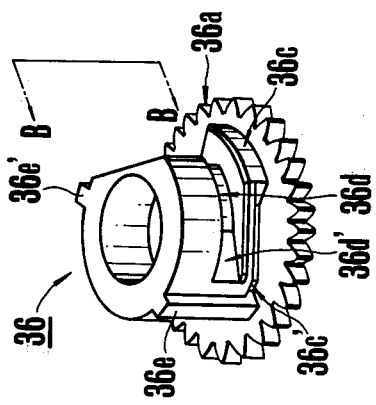
FIG.12B
FIG.12A

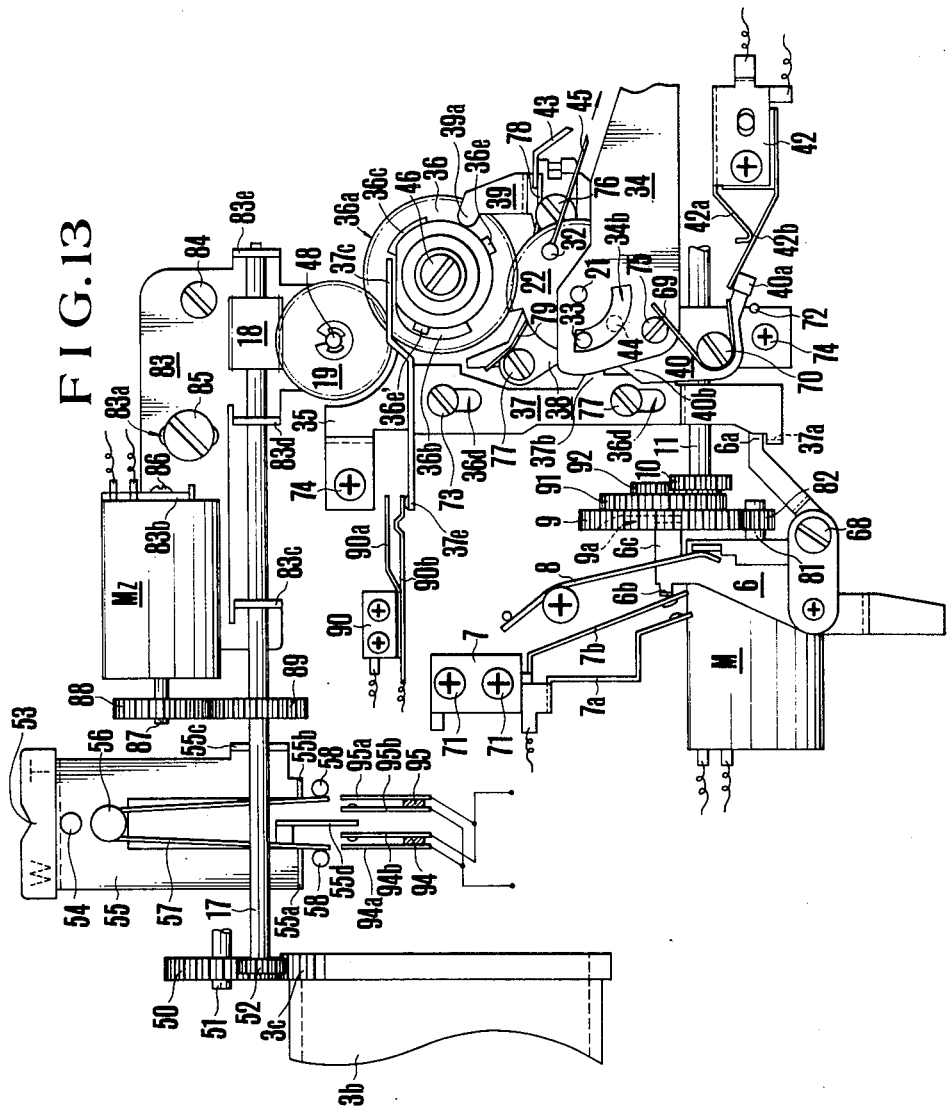

SELF TIMER DEVICE FOR MOTION PICTURE CAMERA

BACKGROUND OF THE INVENTION

1. Field of the Invention

The present invention relates to a self-timer device for a motion picture camera, more particularly, for controlling the timing of the start and the stop of the camera release, namely, the time interval from the automatic photographing setting to the actual start of the photographing and the time interval from the start to the stop of the photographing so as to enable the automatic photographing.

2. Description of the Prior Art

A self-timer device for a motion picture camera which is so designed as to stop the camera release automatically after the elapse of a certain determined time from the start of the camera release to take pictures of one scene automatically has already been proposed.

The proposed self-timer device comprises a locking member for keeping the camera in the released state, by locking the release member in the operation position for the camera release at the time of operating the shutter release member and a lock release member for terminating the camera release by releasing the locking of the release member by means of the locking member, working upon the locking member after the elapse of a certain determined time from the start of the camera release. In this manner, the locking member locks the release member in the operation position when the release member is operated so as to start to photograph while at the same time the above mentioned lock release member is moved, driven by means of the camera driving device in such a manner that, after the elapse of a certain determined time, the locking of the release member by means of the locking member is released by means of this lock release means. Accordingly the release member is returned to the non-operation position so as to terminate the photographing.

However, as in the case with the self-timer device for photographic camera, a part of the purpose of providing a camera with a self-timer is that the photographer himself can take part in the scene, whereby by means of the proposed self-timer the photographer who operates the release member can only take part in the scene on the way so that the scene reproduced is unnatural, which is inconvenient.

Thus, quite recently, a self-timer unit which can control not only the time interval from the automatic photographing setting to the actual start of photographing (hereinafter called the waiting time), but also the time interval from the start to the termination of photographing (hereinafter called the actual photographing time) is proposed and brought on the market as one accessary unit for a motion picture camera.

On example of such is so designed that an electrical timer circuit capable of controlling both the waiting time and the actual photographing time is provided so as to control the timing of the opening and the closing of the switching means connected to the electromagnetic release device by means of the output of the timer circuit, whereby after the elapse of the waiting time, the release device is actuated so as to start photographing, while after the elapse of the actual photographing time the operation of the release device is stopped so as to terminate the photographing.

Another such example is a pure mechanical one and so designed that the control member for controlling the timing of the start and the stop of the camera release is driven by means of the force of a spring member as driving source through the governer mechanism so as to carry out the automatic photography.

However, in the case of the former one, it is necessary to provide a plural number of the time constant means for determining the time intervals in the timer circuits, so that the circuit construction becomes complicated. In the case of the latter one, the composition of various mechanisms also becomes complicated while the force of the spring member is not sufficient as the driving source of the self-timer device. Accordingly, the time intervals to be determined will fluctuate so greatly that the actual photographing time is unstable.

In view of the above mentioned short-comings of the conventional devices, the inventors of the present invention have proposed as per U.S. patent application Ser. No. 595,008 (filing date: July 11, 1975) a self-timer device by means of which only the waiting time is determined by means of an electrical timer circuit while the actual photographing time is determined by the number or the amount of the rotations of the motor for driving the film feeding device as well as the shutter device.

However, even the device in accordance with Ser. No. 595,008 is provided with an electrical timer circuit for the purpose of determining the waiting time, whereby generally such timer circuit consists of electrical components such as condenser, resistor and transistors and therefore is easily subject to the current leakage or the change of the ambient temperature so that in case of the actual photographing the time intervals to be determined are not stable, which is not stable.

In view of the above mentioned short-coming of the formerly proposed device, the inventors of the present invention have further proposed as per U.S. patent application Ser. No. 624,340 (filing date: Oct. 21, 1975) a self-timer device for a motion picture camera including the first motor for driving the film feeding device, the shutter device and so on and the second motor for driving the zoom lens system, which self-timer device is so designed that the control member for the automatic photographing including a cam portions for controlling the timing of the start and the stop of the camera release is driven by the second motor, whereby at the time of the automatic photographing the functional engagement between the second motor and the zoom lens system is released while the cam portion of the control means is engaged with the camera release device in such a manner that the timing of the start and the stop of the camera release is controlled, the control means being driven by the second motor.

However, in accordance with the proposal as per Ser. No. 624,340 the control member (in this case a cam ring) for the automatic photographing can be functionally engaged with the cam ring for zooming in the zoom lens system in such a manner that the engagement can be released selectively, whereby at the time of the automatic photographing the functional engagement of the control member with the cam ring for zooming is released in such a manner that the control member operates alone, so that the composition of the zooming device is necessarily complicated and large by means of the provision of the self-timer.

SUMMARY OF THE INVENTION

The principal purpose of the present invention is to offer a novel self-timer device for a motion picture camera, by means of which such short-comings as mentioned above of the conventional self-timers can be eliminated.

Namely, the principal purpose of the present invention is to solve the problem in such a manner that the interval of the waiting time and that of the actual photographing time are controlled by means of a mechanical timer mechanism instead of an electrical timer circuit, whereby the self-timer device can be composed simple and compact and further especially the actual photographing time can always be controlled precisely.

The above mentioned problem is solved in accordance with the feature of the present invention in such a manner that the self-timer device presents the second motor switch connected in series with the first motor switch to be closed by means of the release means at the time of the camera release, the first timer means for actually starting photographing, closing the second motor switch after the elapse of a certain determined time from the automatic photographing setting and the second timer means for stopping the camera release after the elapse of a certain determined time from the actual starting photographing so as to open the first motor switch and terminate the photographing, whereby the first timer means is driven by means of a spring means as driving source while the second timer means is driven by means of the camera driving motor as driving source and controls the timing of the start and the stop of the photographing at the time of the automatic photographing.

Another purpose of the present invention is to realize above mentioned self-timer device so as to be built in a motion picture camera, without making the inside construction of the camera complicated.

Being connected with this purpose in accordance with a preferred embodiment of the present invention the first timer means includes a governer mechanism by means of which mechanism the waiting time is controlled while the second timer means includes a cam means to be driven by the camera driving motor by means of which cam means the timing for terminating photographing is controlled.

Further in accordance with another embodiment of the present invention it is proposed to drive the second timer means by means of the zooming motor in order to avoid the decrease of the driving torque of the camera driving motor (the shutter driving motor) in the first embodiment, being overloaded if the motor would have to drive the second timer means.

Further other purposes and features will be disclosed out of the following explanation to be made in accordance with the accompanying drawings.

BRIEF DESCRIPTION OF THE DRAWINGS

FIG. 3 shows the self-timer device in ordinary state, namely in the unused state, especially in the released state of camera.

FIG. 4 shows the self-timer device set for the automatic photography.

FIG. 5 shows the self-timer immediately after the start of the automatic photography.

FIG. 6 shows the self-timer immediately after the start of photography after the elapse of a certain determined waiting time after the start of the automatic photography.

FIG. 7 shows the self-timer immediately before the termination of photography after the elapse of a certain determined actual photographing time from the actual start of photographing.

FIG. 8 shows the position of the timer control member 36, the gears 19 and 22 and the first rotary member 39 of the self-timer in the state shown in FIG. 3.

FIG. 9 shows the position of the timer control member 36, the gears 19 and 22 and the first rotary member 39 of the self-timer in the state shown in FIGS. 5 and 6.

FIG. 10 shows the position of the timer control member 36, the gears 19 and 22 and the first rotary member 39 in the state shown in FIG. 7.

FIG. 12 shows the timer control member 36 in detailed perspective view, whereby;

FIG. 12A is the view seen along the arrow A — A in FIG. 12B, and

FIG. 12B is the view seen along the arrow B — B in FIG. 12A.

FIG. 13 shows another embodiment of the motion picture camera in which the self-timer device in accordance with the present invention is built in plane view, whereby the above mentioned second timer means is driven by the zooming motion. This is an improved one of the first embodiment so that the same components as those shown in FIGS. 1 - 12 are omitted.

DETAILED DESCRIPTION OF THE PREFERRED EMBODIMENT

Below the self-timer device in accordance with the present invention will be explained in detail in accordance with the accompanying drawings of an embodiment.

Figure 1:
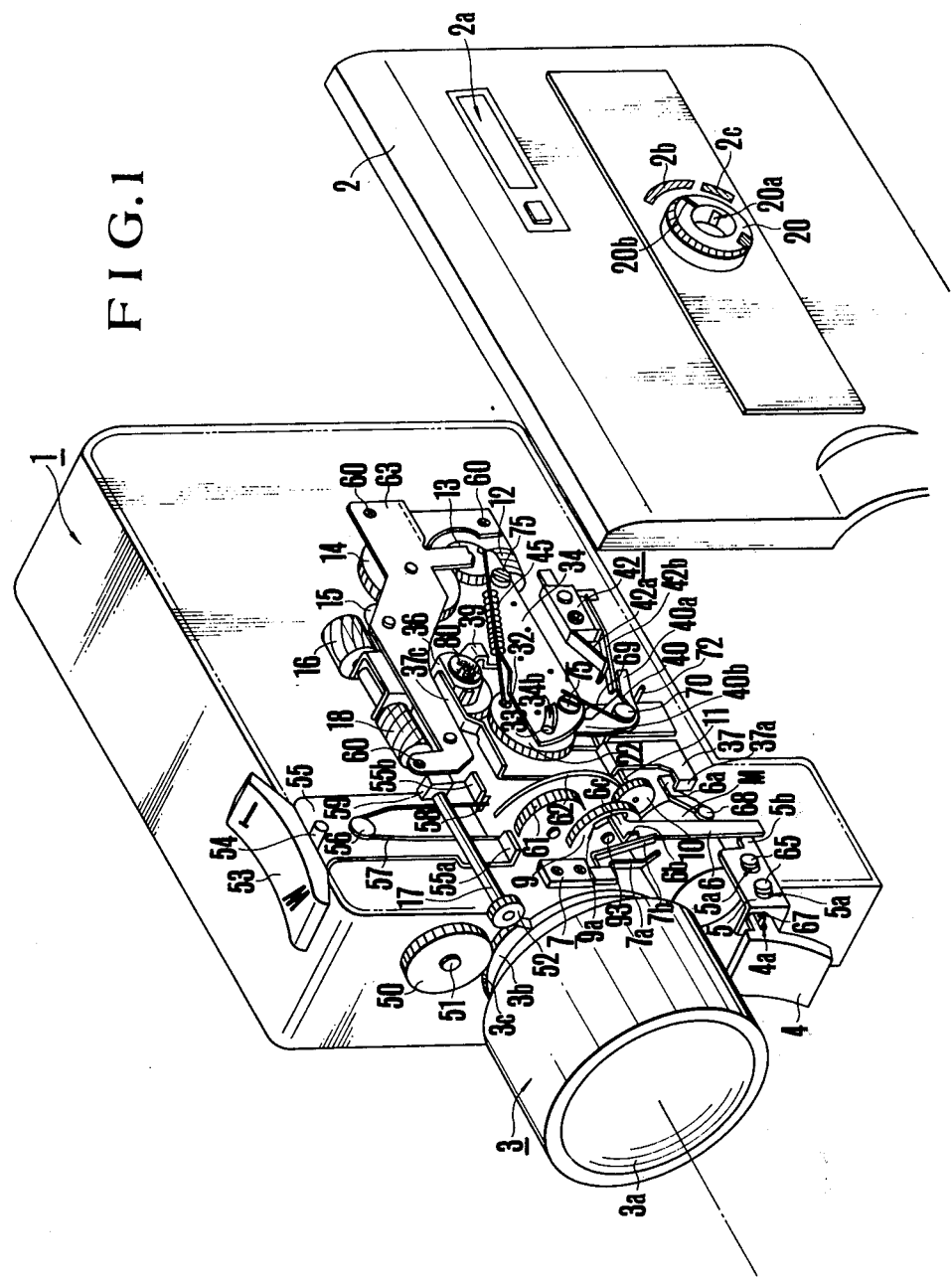
FIG. 1 shows an embodiment of the motion picture camera in which the self-timer device in accordance with the present invention is built in perspective view, whereby a part of the housing is put out so that the interior of the camera can be seen well.

FIG. 1 shows a motion picture camera in which the self-timer device in accordance with the present invention is built in perspective view, whereby a part of the housing is put out so that the interior of the camera can be seen well. In the drawing, 1 is the camera body, 2 the side plate as the camera housing on a part of which a film consumption indicating window 2a is formed. 20 is the operation dial for setting the self-timer, presenting an engagement concave part 20a in the inside and an index 20b on the outside and rotatably mounted on the side plate 2. On the side plate 2 there are provided an indication 2b for indicating the zone, in which the setting of the timer device is impossible and another indication 2c for indicating the zone in which the setting of the timer device is possible, whereby the timer device is set by operating the dial 20, so as to bring the indication 2c of the index 20b within the zone 2c.

3 is a photographic lens of zooming and presenting a lens system 3a and cam ring 3b for zooming, whereby the cam ring 3b presents a geared part 3c.

50 is the gear rotatably born on the shaft 51 fixed on the camera body 1 being engaged with the gear part 3c of the cam rings 3b, 52 the gear fixed on the rotary shaft 17, 53 the zooming operation button and 55 the zooming change over member formed as one body with the zooming operating button 53, whereby the change over member 55 is rotatable in both direction in FIG. 1 around the pin 54 fixed on the camera body as support point. 57 is a fork spring kept by a pin 56 fixed on the zooming change over member 55, whereby the force of the free ends of the fork spring 57 is limited by the pins 58 fixed on the body. 59 is the bearing member for the above mentioned rotary shaft 17, being fixed on the zooming change over member 57, while the rotary shaft is born in the middle of the bearing member 59.

Figure 2:
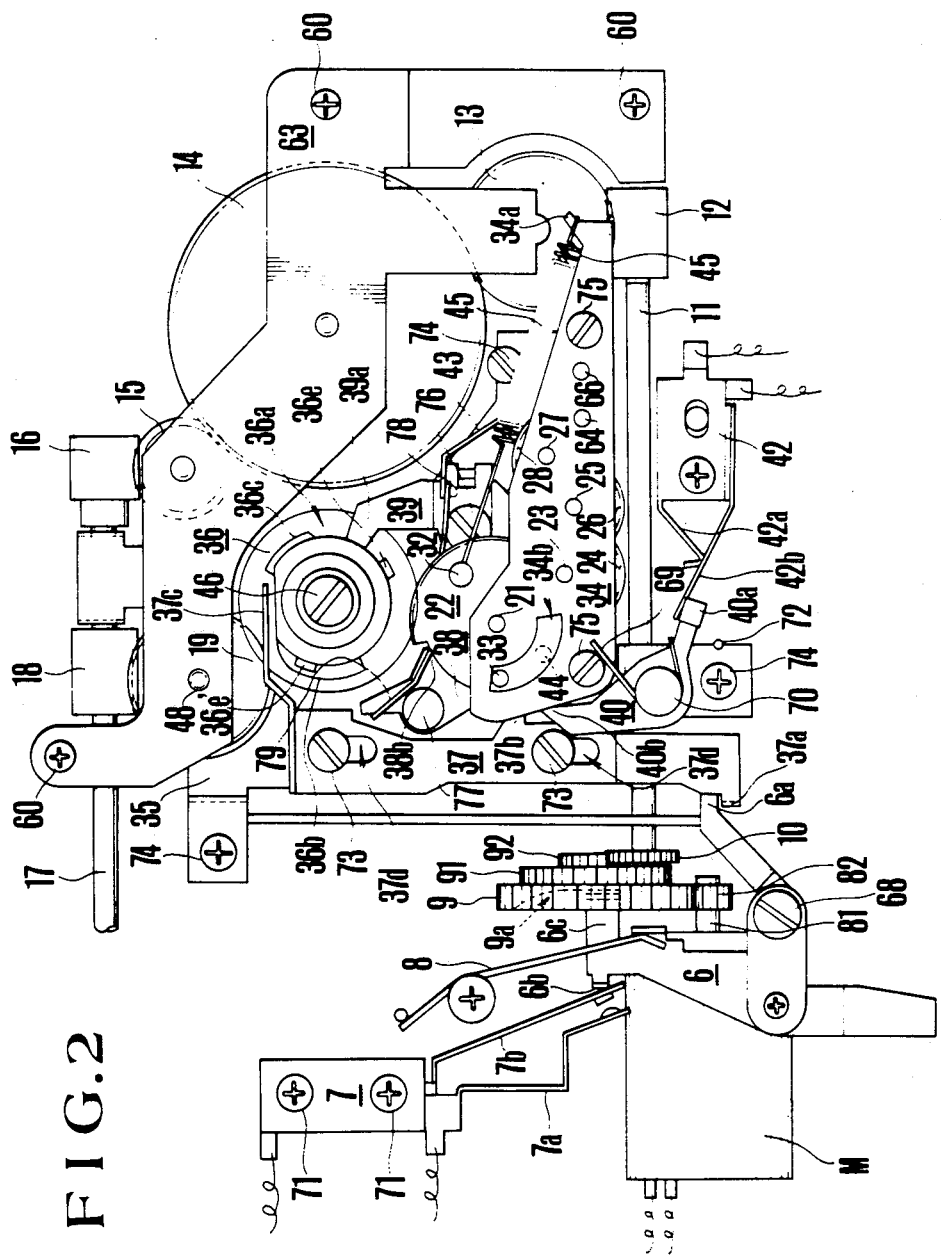
FIG. 2 shows the self-timer device shown in FIG. 1 in plane view for showing the detailed construction.

16 and 18 are the worm gears fixed on the shaft 17, 9 the gear driven by a motor M as the camera driving source, being engaged with the gear 82 fixed on the output shaft of M and presenting further two gears 91 and 92 as is shown in FIG. 2. 93 is the shaft of the gear. 61 is a gear in engagement with another gear 91 (FIG. 2), which rotates as one body with the gear 9, 62 the conventional rotary shutter blade, 10 a gear in engagement with another gear (FIG. 2), which rotates as one body with the gear 9, whereby the gear 10 is fixed on a shaft pivoted on the body 1 and rotates as one body with the shaft 11. 12 is the worm gear fixed on the shaft 11, 13 the worm wheel in engagement with the worm gear 12, 14 the gear in engagement with the gear 15 engaged with the worm wheel 13 and the worm gear 16, whereby the gear 14 is intended to wind up the film winding up shaft (not shown in the drawing).

63 is the base plate rotatably bearing the gears 14 and 15, being fixed on the camera body by means of a screw 60.

4 is the release button engaged with the shaft 67 fixed on the camera body 1 by means of a long hole 4a in such a manner that the release button 4 is slidable in the long hole 4a, being guided by the shaft 67. 5 is the connecting member presenting a long hole 5a in which the pin 65 provided on the camera body 1 engages in such a manner that the connecting member 5 is slidable in the long hole 5a, being guided by the pin 65. 6 is the holding lever for holding the shutter blade so as to keep the photographic opening (not shown in the drawing) in a closed state, whereby the lever 6 is rotatable around the pin 68 fixed on the camera body 1 as support point and energized clockwise around the pin 68 by means of a spring 8 (FIG. 2). The holding claw 6c of the holding lever 6 can selectively engage with the stopper part 9a of the side face of the above mentioned gear 9, whereby when the claw 6c engages with the stopper part 9a, the rotation of the gears 91 and 92 is prevented while when the claw 6c is out of engagement with the stopper part 9a the gears 91 and 92 are free to rotate. 7 is the first motor switch consisting of the contacts 7a and 7b for controlling the start and stop of the motor M, being fixed on the camera body 1 by means of the screw 71. Hereby the contact 7b of the switch 7 is normally in contact with the folded part 6b of the holding lever 6 due to its own elasticity, whereby when the holding lever 6 is moved clockwise (into the position shown in FIG. 1 and FIG. 2) by means of the spring 8 (namely when the holding claw 61 of the lever 6 engages with the stopper 9a of the gear 9) the contact 7b is away from the contact 7a so as to open the motor circuit, while when the holding lever 6 is moved anti-clockwise against the force of the spring 8 (namely when the engaging claw 6c of the lever is out of engagement with the stopper part 9a) the contact 7b is in contact with the contact 7a so as to close the motor circuit.

The above mentioned composition relates to the power transmission mechanism and the zooming mechanism quite general for the motion picture camera. The operation of the power transmission mechanism and the zooming mechanism will be explained below.

FIG. 1 shows the camera in a state out of operation.

When now the release button 4 is pushed to the right in the drawing in order to operate the camera, the connecting member 5 is also moved to the right in the drawing in functional engagement with the release button 4. When the connecting member 5 is moved to the right in the drawing, the holding lever 6 in contact with the one end 56 of the connecting member 5 is rotated anticlockwise around the pin 68 against the force of the spring 8. When the holding lever 6 is rotated anticlockwise, the engagement of the one end of the holding claw 6c of the lever 6 with the stopper part 9a of the gear 9 is solved while the contact 7a of the switch 7 is brought into contact with the contact 7b so as to form a motion driving circuit and drive the motor M. When the motion M is rotated, the driving power of the motor is transmitted to the gear 9 so as to rotate the gear 9. The rotation of the gear 9 is transmitted to the shutter blade 62 through the gears 91 and 61, so as to rotate the shutter blade 62, while by means of a conventional means the film is fed in relative connection with the shutter blade 62. At the same time, the rotation of the gear 9 is transmitted to the gear 14 through the gears 92 and 10, the shaft 11, the worm gear 12 and the worm wheel, so as to drive the film winding up shaft (not shown in the drawing) by means of conventional friction means. Further the rotation of the gear 14 is transmitted to the worm gear 16 through the gear 15, so as to rotate the worm gear 16. By means of the rotation of the worm gear 16, the shaft 17 is rotated so as to rotate the gear 52 and the worm gear 18.

However, FIG. 1 shows the state in which no zooming operation is carried out, in which state by means of the effect of the forked spring 57 the zooming change over member 55 is placed in the neutral position (FIG. 1), whereby the gear 52 is running idle, out of engagement with the gear 50 and the gear part 3c of the cam ring 3b. When in this state the zooming operation button 53 is pushed by the finger to the side T (telephoto) in FIG. 1, the zooming change over member 55 is rotated clockwise around the pin 54 whereby the spring is charged by the open ends. When the zooming change over member 55 is rotated clockwise, the bearing member 59 is moved as one body in such a manner that the end (at the side of the gear 52) of the rotary shaft 17 is moved downwards until the gear 52 comes to engage with the gear part 3c of the cam ring 3b, whereby the rotation of the shaft 17 is transmitted to the cam ring 3b through the gear 52 and the gear part 3c so as to rotate the cam ring 3b in such a manner that the zooming is carried out to the telephoto side.

When the hand is removed from the zooming operation button 53, the zooming change over member 55 is returned to the neutral position again by means of the spring 57 charged by the open ends 55b. In functional engagement with the then return motion of the zooming change over member 55 into the neutral position, the rotary shaft 17 is also returned into the neutral position by means of the bearing member 59 in such a manner that the engagement of the gear 52 with the gear part 3c of the cam ring 3b is solved.

When the button 53 is pushed to the side W (wide angle), the zooming change over member 55 is rotated anti-clockwise around the pin 54, whereby the spring 57 is charged by the open end 55a. When the zooming change over member 55 is rotated anticlockwise, by means of the movement of the bearing member 59 as one body the end (at the side of the gear 52) of the rotary shaft 17 is moved upwards, whereby the gear 52 is brought into engagement with the gear 50 in such a manner that the rotation of the rotary shaft 17 is transmitted to the cam ring 3b through the gears 52 and 50 and the gear part 3c so as to rotate the cam ring 3b to the left whereby the zooming is carried out to the side of wide angle. When the hand is removed from the zooming operation button 53, in the same way as the above mentioned case the zooming change over member 55 is returned to the neutral position again by means of the spring of the spring 57 charged by the opened end. In functional engagement with the then return motion of the zooming change over member 55 into the neutral position, the rotary shaft is also returned into the neutral position by means of the bearing member 59, whereby the engagement of the gear 52 with the gear 50 is solved.

So far the composition and the operation of the power transmission mechanism and the zooming mechanism of the motion picture camera are explained. Below the self-timer device will be explained.

FIG. 2 to FIG. 10 respectively shown the self-timer device shown in FIG. 1 in plane view for showing the detailed constructions, whereby the important components of power transmission mechanism as well as the zooming mechanism are partially shown. The members with the same figures as those in FIG. 1 are the same members.

In FIG. 2 to FIG. 10, 35 is the base plate fixed on the camera body 1 by means of the screw 74, on which base plate 35 the important components of the self-timer device to be explained later are provided, whereby the self-timer device is formed as one body 1. 34 is the upper plate fixed on the base plate 35 by means of the screw 75, 22 the sector gear rotatably born by the shaft 21 between the base plate 35 and the upper plate 34, whereby on the sector gear 22 three pins 32, 33 and 44 are provided. Among them, the pin 33 projects into the opening 34b formed in the upper plate 34 so as to determine the rotation amount of the sector gear 22 (corresponding to the waiting time until the actual photographing is started).

24 is the gear rotatably born on the shaft 23 between the base plate 35 and the upper plate 34, presenting a pinion 24a as one body which engages with the gear 22. 26 is the gear rotatably born on the shaft 25 between the base plate 35 and the upper plates 34, presenting the pinion 26a as one body which engages with the gear 24. 28 is the gear rotatably born on the shaft 27 between the base plate and the upper plate 34, presenting a pinion 28a as one body which engages with the gear 26. 30 (FIGS. 3 to 7) is the wheel rotatably born on the shaft 64 between the base plate 35 and the upper plate 34, 29 a pinion formed as one body with the wheel 30, being engaged with the gear 28. 31 is an anchor engaged with the wheel 30, being rotatably born on the shaft 66. The wheel 30 and the anchor 31 are intended to adjust the rotation speed of the gears 22, 24 and 28. 45 in FIG. 2 is the spring provided between the one end 34a of the upper plate 34 and the pin 32 on the gear 22, being intended to energize the gear 22 normally clockwise in FIG. 2.

40 is the swing lever born on the pin 70 fixed on the base plate 35, being normally energized clockwise by means of the spring 69. 72 is intended to determine the clockwise rotation of the swing lever 40.

42 is the second motor switch connected in series with the first motor switch 7 (FIG. 11), presenting the electric contact pieces 42a and 42b, whereby the contact piece 42b is normally placed in a position at which the contact piece 42b is out of contact with the contact piece 42a but in contact with the work arm 40a of the swing lever 40.

37 is the slide member presenting a work arm 37a, the projection 37d, the folded part 37c and the guide slot 37d, whereby in the long hole 37d of the slide member 37 the screw 73 provided on the base plate 35 engages in such a manner that the slide member 37 is movable up and down, being guided by the screw 73.

39 is the first rotary member presenting a cam driven part 39a, the work arm 39b and projection 39c, rotatably born on the screw 76 provided on the base plate 35 and energized anticlockwise in FIG. 2 by means of the spring 78. On the projection 39c a plate spring 43 is provided, whereby the claw 43a of the plate spring 43 engages with the gear 28, when the first rotary member 39 is rotated clockwise, so as to prevent the rotation of the gear while when the first rotary member 39 is rotated anticlockwise, the engagement of the claw 43a with the gear 28 is solved so as to allow the gear to rotate freely.

Figure 8:
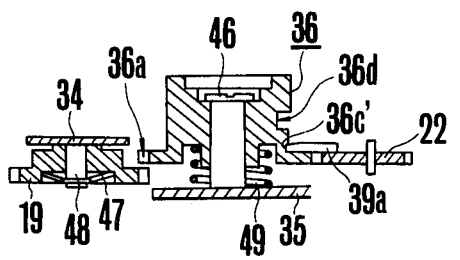
Figure 9:
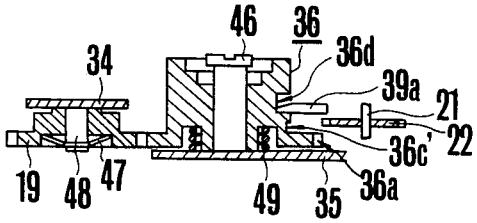
Figure 10:
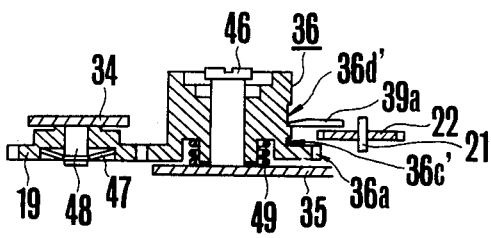

38 is the second rotary member rotatable around the pin provided on the base plate 35, presenting a holding arm 38a engageable with the projection 37b of the slide member 37, so as to hold the slide member 37 in the upper position and the projection 38b. This second rotary member 38 is normally energized clockwise in FIG. 2 by means of the spring 79 in such a manner that when the first rotary member 39 is rotated clockwise, the work arm 39b of the first rotary member 39 is brought in contact with the projection 38b of the second rotary member 38, whereby the second rotary member 38 is rotated anticlockwise against the force of the spring 79 so that the holding arm 38a is withdrawn from the position at which the holding arm 38a engages with the projection 37b of the slide member 37. 36 is the timer control member for controlling the operation of the slide member 37 and of the first rotary member 39, being provided on the base plate by means of a screw 46 provided on the base plate as shown in FIGS. 8 – 10 in section so as to be slidable as well as rotatable with reference to the screw 46.

Hereby in FIGS. 8 – 10, 49 is the spring for normally energizing the timer control member 36 along the direction along which the timer control member 36 is off from the base plate, being provided between the base plate 35 and the timer control member 36.

19 is the gear rotatably born on the shaft 48 fixed on the base plate 63, while 47 is a friction member. The gear 19 is normally engaged with the gear 18 fixed on the rotary shaft 17.

As is shown in detail in FIGS. 12A and 12B, the timer control member 36 presents a gear part 36a selectively engageable with the gears 19 and 22, the first camming surface 36b for operating the slide member 37, the second and the third camming surfaces 36c and 36d for controlling the operation of the first rotation member 39 and the projecting parts 36e and 36e' which are led into the concave part 20a on the operation dial 20 provided on the side plate of the camera housing so as to be connected with the dial 20.

When the control member 36 is in the first position (FIG. 8) in which the member 36 is not moved toward the base plate 35, the gear part 36a engages with the gear 22, while the control member 36 is in the second position (FIGS. 9 and 10) in which the control member 36 is moved toward the base plate 35, the gear plate 36a engages with the gear 19.

The first cam part 36b is brought is contact with the folded part 37c of the slide member 37, when the timer control member 36 is rotated clockwise, so as to make the slide member 37 slide upwards along the shape of the cam.

The second cam 36c is brought in contact with the cam driven part 39a of the first rotary member 39, when the timer control member 36 is rotated clockwise, so as to rotate the first rotary member 39 clockwise along the shape of the cam.

The third cam part 36d is a cam to be engaged with the cam driven part 39a of the first rotary member 39, when the timer control member 36 is brought in the second position, whereby the cam part 36d is provided with the tapered part 36d' by means of which the cam driven part 39a of the rotary member 39 escapes from the cam part 36d after a certain determined time, when the timer control member 36 is rotated anticlockwise.

The central part of the timer operation dial 20 presents an opening for an indication disc "SELF TIMER" provided on the head of the timer-control member 36, whereby by pushing the indication disc inside by means for example of a finger it is possible to bring the timer-control member 36 from the first position into the second position.

Figure 11:
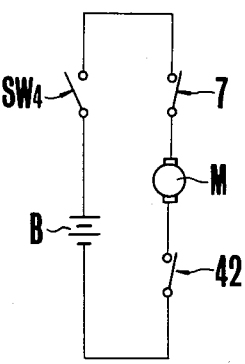
FIG. 11 shows a circuit diagram applicable for the motion picture camera shown in FIG. 1, in which the self-timer device in accordance with the present invention is built.

FIG. 11 shows the driving circuit of the motion picture camera provided with the self-timer device composed as above. In FIG. 11, M is the motor as the camera driving source for driving the shutter blade 62, the cam ring 3 for zooming and so on as is clear from the above mentioned composition.

B is the current source, SW the main switch of the camera, 7 and 42 and the first and the second motor switch, whereby they are connected in series with the motor M.

Below the operation of the self-timer device composed as mentioned above will be explained.

Figure 3:
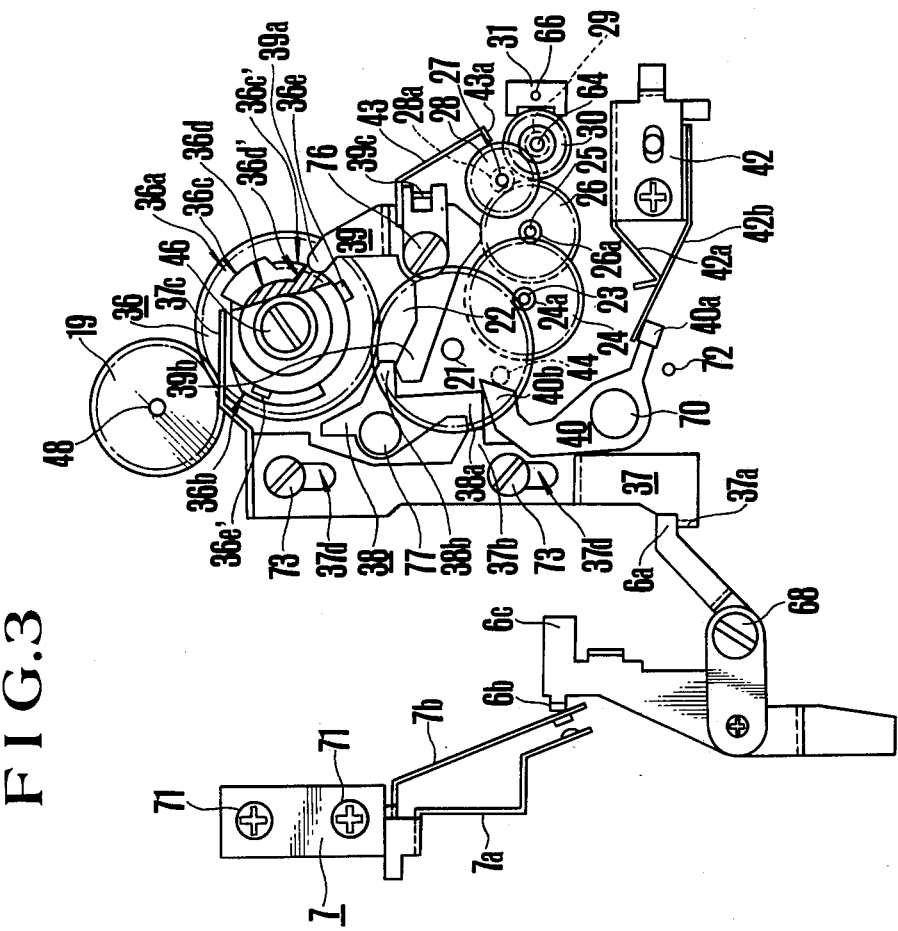
FIG. 3 - 10 respectively show the self-timer device in various operation state in plane view, whereby.

FIG. 3 as well as FIG. 8 show the self-timer device in the state out of service. In this state the slide member 37 is moved downwards, whereby when the release button 4 is not pushed down, as shown in the drawing, the holding lever 6 is also moved clockwise by means of the force of the spring 8 in such a manner that the contact piece 7a of the switch is off from the contact piece 7b.

Further as is shown in FIG. 8, the timer control member 36 assumes the first position on the screw 46, whereby the gear part 36a is engaged with the gear 22.

The cam driven part 39a of the first36c' is formed as groove so that even if in this state the timer-control member 36 is pushed, as is shown in FIG. 9, toward the second position on the screw, the translation into the position is prohibited, the cam driven part 39a of the rotary member 39 being hindered by the groove wall. At this time, the projection 38b of the rotary member 38 is kept of the work arm 39b of the first rotary member 39, so that the rotary member 38 is prevented from the clockwise rotation whereby the holding arm 38a assumes a position at which the arm 38a does not engage with the projection 37b of the slide member 37. Hereby, the projecting pin 44 of the gear 22 engaged with the gear part 36a of the control member 36 is kept at the position shown in FIG. 3, whereby the projection arm 40b of the swing lever 40 is in contact with the projection pin 44 so as to be rotated anticlockwise against the force of the spring 69, while the work arm 40 assumes a position at which the arm 40 pushes the contact piece 42b of the switch 42 so as to be in contact with the contact piece 42a. Namely, the second motor switch 42 in the electrical circuit shown in FIG. 11 is closed.

When in this state the release button 4 is pushed so as to rotate the holding lever 6 anti-clockwise around the pin 68 against the force of the spring 8, the holding lever 6 brings the contact piece 7b of the first motor switch 7 in contact with the contact piece 7a so as to form a current supply circuit for the motor M, releasing the engagement of the holding claw 6c with the gear 9, whereby the photographing is started as explained above.

When the release button 4 is no more pushed, the holding lever 6 is rotated clockwise by means of the force of the spring 8 in such a manner that the holding lever 6 releases the contact of the contact piece 7b of the switch 7 with the contact piece 7a so as to stop the motor M, while the gear 9 is kept by the holding claw 6c in the phase in which the shutter blade 62 closes the photographic opening.

The above mentioned is the mode of photography without using a self-timer device.

Below the one cut timer photography by means of the self-timer device will be explained.

The self-timer device in accordance with the present invention roughly presents the waiting time set mode, the waiting time operation and the photographing mode (starting and stopping).

(WAITING TIME SETTING MODE)

In order to set the waiting time using the self-timer device using the self-timer out of operation as shown in FIGS. 3 and 8, the timer operation dial 20 projecting out of the side plate 2 of the camera housing is rotated clockwise until the index 20 is located within the indication zone 2c of the side plate 2, whereby in functional engagement of the rotation of the timer operation dial 20 the self-timer control member 36 whose abutments 36e and 36e' engage in the long hole 20a of the timer operation dial 20 is rotated clockwise. When the self-timer control member 36 is rotated clockwise, the gear 22 in engagement with the gear part 36a is rotated anti-clockwise until the provided pin 33 is limited by the opening 34b of the upper plate 34 in such a manner that the spring 45 provided between the gear 22 and the one end 34a of the upper plate 34 is charged.

At the same time with this, the folded part 37c of the slide member 37 is brought in contact with the first cam 36b of the self-timer control member 36, by means of which the slide member 37 is moved upwards, being guided by the screw 73. When the slide member 37 is moved upwards, the projection arm 6a of the holding lever 6 in engagement with the work arm 37a of the slide member 37 is drawn up by means of the work arm 37a, whereby the holding lever 6 is rotated anticlockwise against the force of the spring 8 so as to bring the contact piece 7a of the first motor switch 7 in contact with the contact piece 7b, quite independent of the push operation of the release button 4 and close the switch 7, while the engagement of the gear 9 is released.

Figure 4:
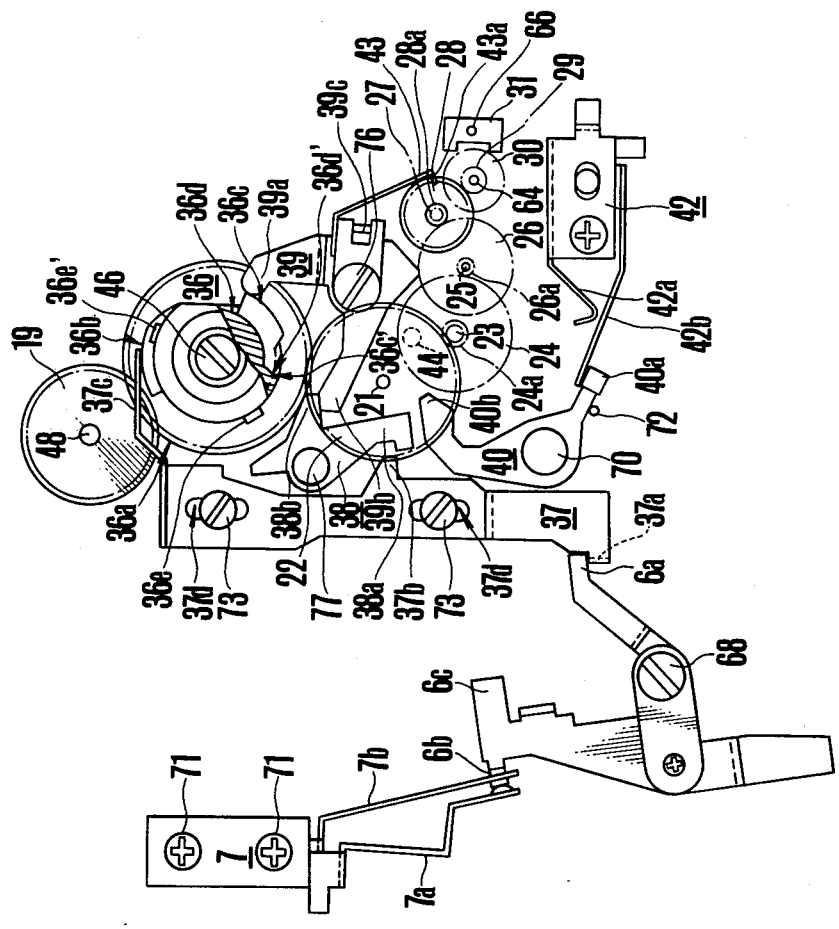

By means of the clockwise rotation of the control member 36, the gear 22 is rotated anticlockwise, namely in the reversed direction of the rotation of the control member 36, so that the projection pin 44 provided on the gear 22 is retired from the projection arm 40b of the swing lever 40 as shown in FIG. 4 and therefore the limitation of the clockwise rotation of the swing lever 40 by means of the projection pin 44 is released so that by means of the force of the spring 69 the swing lever 40 is rotated clockwise until the work arm 40a is brought in contact with the pin 72, whereby the contact of the contact piece 42a of the second motor switch 42 with the contact piece 42b is released. Namely at this time the second motor switch 42 is opened. Further with reference to the first rotary member 39, nearly at the same time when the folded part 37c of the slide member 37 is brought in contact with the first cam part 36b of the control member 36, the first rotary member 39 is brought in contact with the second cam part 36c and rotated clockwise against the force of the spring 78 by means of the cam part 36c, whereby the work arm 39b pushes the projection part 38b of the second rotary member 38 anticlockwise so as to rotate the second rotary member 38 anticlockwise against the force of the spring 79, while the claw part 43a of the plate spring 43 engages with the gear 28, so as to prevent the rotation of the gear 28. Namely, the rotation of the gears 22, 24, 26 and 28 and of the wheel 30 is prevented. In consequence, in this state by means of the charged spring the gear 22 is energized clockwise, thereby the rotation is prevented by the claw part 34a. Hereby the waiting time setting of the self-timer is completed as is shown in FIG. 4.

(WAITING TIME OPERATION)

In order to actuate the self-timer after having completed the waiting time setting, the self-timer control member 36 is pushed inside against the force of the spring 49 by means of the finger through the central opening of the timer operation dial 20 (into the second position shown in FIG. 9), whereby the engagement of the gear part 36a of the control member 36 with the gear 22 is released in such a manner that the gear part 36a engages with the gear 19 as is shown in FIG. 9. At the same time, the cam driven part 39a of the first rotary member 39 engages with the third cam 36d of the control member 36. Hereby the third cam 36d is lower than the other part as is shown in FIG. 12A, the first rotary member 39 is rotated anticlockwise by the amount corresponding to the depth of the third cam 36d and therefore the engagement of the claw part 43a of the plate spring 43 with the gear 28 is released. Hereby by means of the rotary member 39 the timer control member 36 is kept in the second position shown in FIGS. 9 and 10. At the same time, by means of the anticlockwise rotation of the first rotary member 39 the work arm 39b is retired anticlockwise so that the engagement of the work arm 39b with the projection part 38b of the second rotary member 38 is released whereby the second rotary member 38 is rotated clockwise by means of the force of the spring so that the holding arm 38a engages with the projection part 37b of the slide member moved upwards as is shown in FIG. 5.

Figure 5:
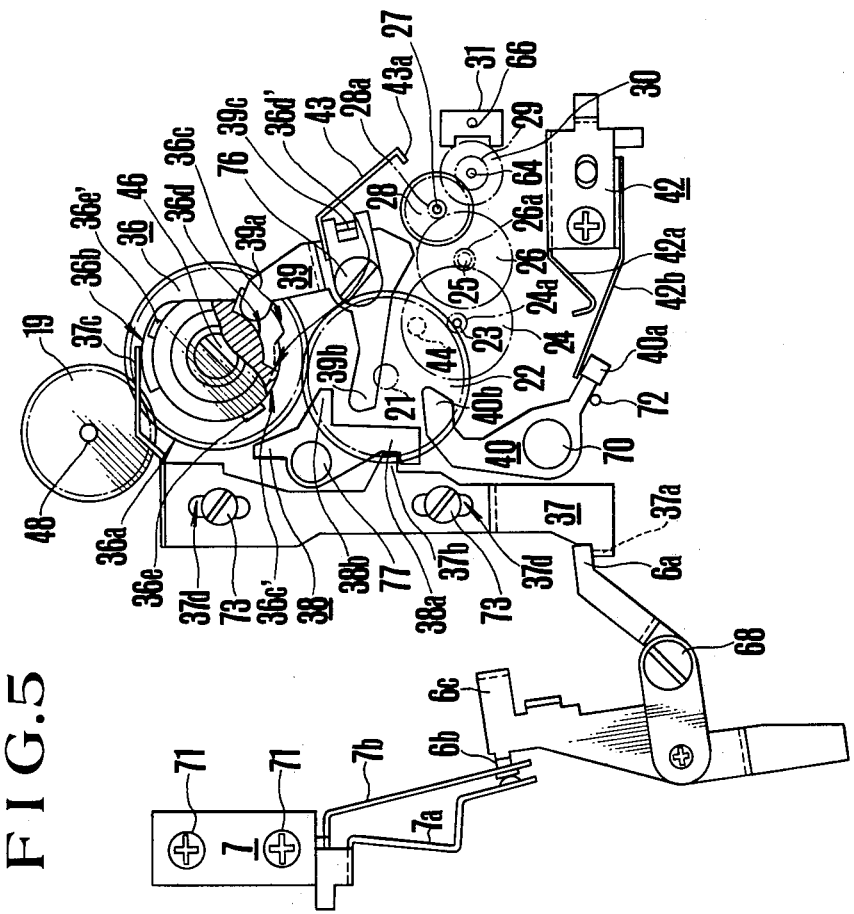

As is clear from the state shown in FIG. 5, the engagement of the claw part 43a of the plate spring 43 with the gear 28 has been solved so that the gears 22, 24, 26 and 28 and the wheel 30 are at least in a position to rotate in collaboration with each other and therefore by means of the charged spring 45 the gear 22 is rotated anticlockwise. The rotation of the gear 22 is transmitted to the wheel 30 through the gears 24, 26 and 28, whereby the adjustment is carried out by the collaboration of the wheel 30 with the anchor 31.

Namely in this state the first motor switch 7 is closed while the second motor switch 42 is opened so that no current is supplied to the motor M.

When in this way, the gear 22 is rotated clockwise by the force of the charged spring 45, the projection pin 44 provided on the gear 22 is again brought in contact with the projection arm 40b of the swing lever 40 in such a manner that the swing lever 40 having moved clockwise by the rotation of the gear 22 is gradually rotated anticlockwise against the force of the spring 79. When the swing lever 40 is rotated anticlockwise, with the rotation the work arm 40 brings the contact piece 42b of the second motor switch 42 closer to the contact piece 42a against its proper elasticity in such a manner that nearly when the force of the charged spring 45 is out, the contact piece 42b is brought in contact with the contact piece 42a so as to close the second motor switch. Thus the first motor switch 7 has been closed from the beginning, the motor M starts to run as in shown in FIG. 6.

Thus the waiting time operation is terminated and at the same time the photographing is started after the elapse of a certain determined time.

(PHOTOGRAPHY AFTER A CERTAIN DETERMINED TIME)

When in this way after the elapse of a certain determined time the second motor switch 42 is closed and the motor M starts to run, the worm gear 18 is rotated by means of the above mentioned power transmission mechanism, whereby the rotation of the worm gear is transmitted to the gear part 36a of the self-timer control member 36 through the gear 19 in engagement with the gear 18 so as to rotate the self-timer control member 36 anticlockwise.

Figure 7:
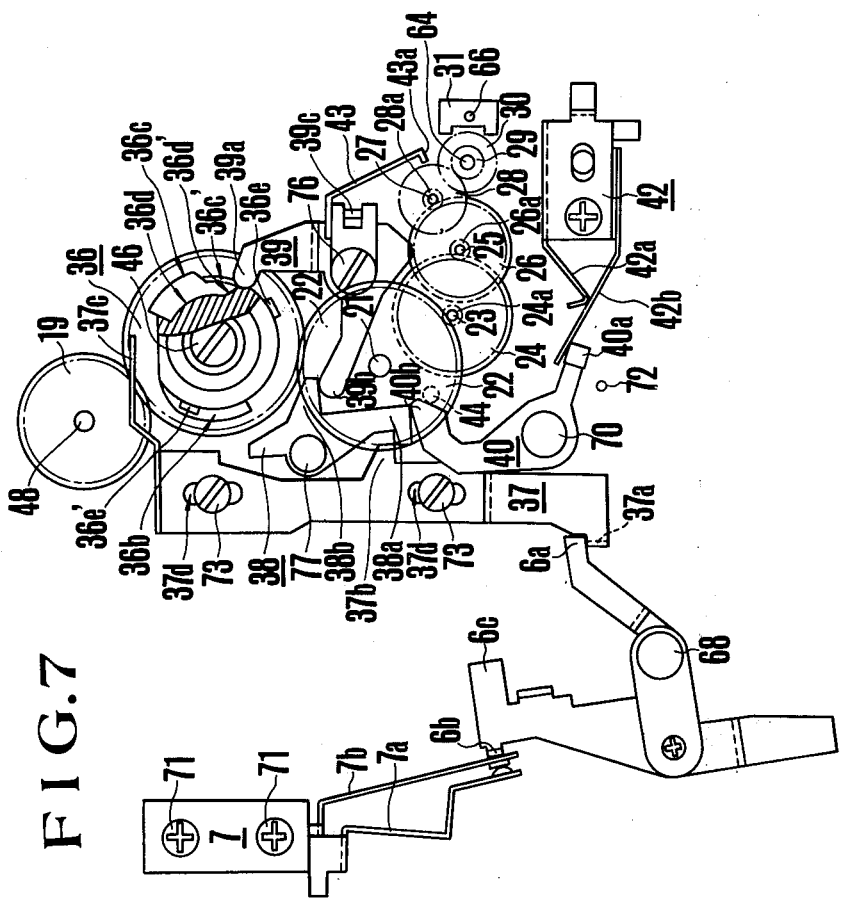

When in this way, the self-timer control member 36 is rotated anticlockwise and the third cam 36d in engagement with the cam driven part 39a of the first rotary member 39 approaches the end position, the groove becomes less deep due to the tapered part 36d' as is shown in FIGS. 7, 10 and 12A and therefore the rotary member 39 is gradually rotated anti-clockwise. At the end position of the tapered part 36d' where there is no groove any more, the self-timer control member 36 resumes the state shown in FIG. by means of the force of the spring 49.

Immediately before the self-timer control member 36 resumes the state shown in FIG. 8, as is shown in FIG. 7 by means of the work arm 39b of the first rotary member 39 the second rotary member 38 is rotated anticlockwise against the force of the spring 79 in such a manner that the engagement of the projection part 37b of the slide member 37 with the holding arm 38a of the second rotary member 38 is released. In consequence the slide member 37 is pulled downward by means of the clockwise force of the spring 8 working upon the release lever 6 and at the same time the release lever 6 stops pushing the contact piece 7b of the first motor switch 7, so as to bring the contact piece 7a off from the contact piece 7b. Namely, the first motor switch 7 is opened. Thus, the motor M stops and the photographing is terminated. At this time the timer device has resumed the state shown in FIG. 3, and therefore the above mentioned automatic photography can be repeated by means of the self-timer device.

As explained above, the self-timer device for motion picture camera in accordance with the present invention comprises the second motor switch connected in series with the first motor switch to be closed by the release means at the time of the camera release, the first timer means for actually starting photographing, closing the second motor switch after the elapse of a certain determined time from the automatic photographing setting and the second timer means for terminating the photographing, stopping the camera release after the elapse of a certain determined time from the actual start of the photographing, so as to open the first motor switch, whereby the first timer means present a spring means as driving means, the second timer means is driven by the camera driving motor and controls the timing of the start and the stop of the automatic photographing, so that the self-timer itself can be composed compact and further the driving source of the second timer means for determining the actual photographing time is the camera driving motor so that the time interval between the actual photographing times can be always precisely determined, which are very profitable.

As is clear from the embodiments so far explained, the self-timer device in accordance with the present invention can be composed as one unit for other various mechanisms and devices built in the camera so as to be built in the motion picture camera without making the internal construction of the camera complicated any more.

Below an improvement according to which the second timer means, namely the self-timer control member 36 is driven by another motor, for example, for zooming in order to avoid the increase of the load of the camera driving motor due to the provision of the self-timer device will be explained in accordance with FIGS. 13 and 14.

In these drawings, the principal components of the self-timer device as well as the motion picture camera are same as of the camera shown in FIGS. 1 to 12, so that the same numerical figures are applied to them. Further the explanation for them are omitted excepting the improved ones.

In case of the camera shown in FIGS. 1 to 12, the shutter 62, the film winding up shaft and the zoom lens 3 are driven by means of a single motor M, while the camera of the present embodiment is provided with another motor Mz expecially intended to drive the zoom lens 3 for zooming.

In FIG. 13, 83 is the support plate rotatable pivoted on the camera body by means of the shaft 84 in such a manner that the rotation is limited by means of the guide slot 83a and the pin 85 provided on the camera body and engaging in the slot 83, whereby on the folded part 83b the zooming motor Mz is fixed by means of the screw 86. On the support plate 83, further three folded parts 83c, 83d and 83e are formed, whereby by means of the bearing holes provided on the folded parts the rotary shaft 17 is rotatably born. 89 is a gear fixed on the rotary shaft 17 in the same way as in the case of the gear 52 and the worm gear 18, being normally engaged with the gear 88 fixed on the output shaft 87 of the zooming motor Mz and therefore the rotary shaft 17 is driven by the motor Mz through the gears 88 and 89, while the control member 36 as the second timer means is driven for determining the photographing time through the gears 88 and 89, the rotary shaft 17, the worm gear 18 and the worm wheel 19.

Figure 14:
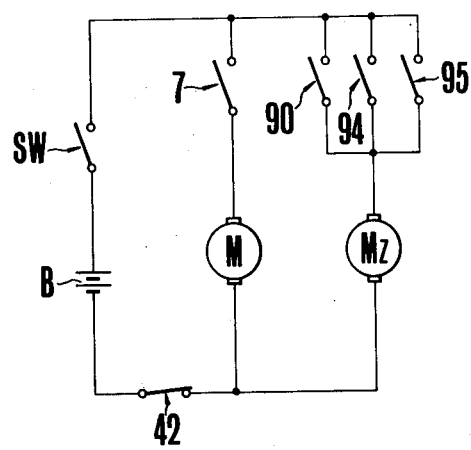
FIG. 14 is an electrical circuit applicable to the motion picture camera shown in FIG. 13.

94 and 95 are the switches for starting the motor at the time of zooming, respectively presenting the contact pieces 94a and 94b, and 95a and 95b, whereby they are selectively operated by means of the work piece 55d of the change over member 55 when the zooming operation button 53 is operated in such a manner that when the button 53 is pushed to the side of T (Telephoto) the switch 94 is closed while when the button 53 is pushed to the side of W (wide angle) the switch 95 is closed, whereby both of them are connected parallel to each other with the motor Mz as is shown in FIG. 14 so that the motor Mz can immediately be started in either case.

90 is a switch whose opening and closing are controlled by means of the work piece 37e of the slide member 37 at the time of the automatic photography similarly to the motor switch 7, presenting the contract pieces 90a and 90b and connected parallel to each other with the switches 94 and 95 so that the starting and the stopping of the motor Mz are controlled by means of the switch quite independent of the switches 94 and 95.

Further as is shown in FIG. 14, the series circuit consisting of the motor Mz, the switches 90, 94 and 95 is connected in parallel to the series circuit consisting of the motor M and the switch 7 in such a manner that the motor Mz for zooming is supplied with current from the current source B so as to rotate only when the switches SW and 42 and either one of the switches 90, 94 and 95 are closed.

In FIG. 13, 55c is a bearing part serving as substitute of the bearing member 59 for the rotary shaft 17 in FIG. 1, hereby being formed as a part of the change over member 55 in such a manner that at the time of operating the button 53, the selective engagement of the gear 52 either with the gear 50 or with the gear part 3c of the cam ring 3b can be obtained through the bearing part 55c.

Below the operation of the motion picture camera will be explained in accordance with the above mentioned embodiment, being divided in the case of the ordinary photography and the case of the automatic photography by means of the self-timer.

(OPERATION IN CASE OF THE ORDINARY PHOTOGRAPHY)

When after closing the switch SW in FIG. 14, the release button 4 is pushed, the engagement of the gear 9 by means of the holding lever 6 is released while at the same time by means of the lever 6 the switch 7 is closed, whereby the current supply circuit to the motor M is established (as explained above in the unused state of the self-timer device the switch 42 remains closed so that all of the three switches SW, 7 and 42 are all closed) so that the motor M starts to run and the photographing is started, the shutter 62 being driven as explained above.

When the zooming operation button 53 is operated, for example, when the button 53 is pushed to the side of T, by means of the work piece 55c of the change over member 55 the contact piece 94b of the switch 94 is brought in contact with the contact piec 94a, whereby the switches SW and 42 are already closed so that a current supply circuit to the motor Mz is established and the motor Mz starts to run, while at the same time by means of the bearing part 55c of the change over member 55 the support plate 83 is rotated along the counter-clockwise direction around the shaft 84, whereby the gear 52 fixed at the end of the rotary shaft 17 engages with the gear part 3c of the cam ring 3b in such a manner that the cam ring 3b is driven by means of the gears 88 and 89, the rotary shaft 17 and the gear 52, so that as explained above the zooming toward the TELEPHOTO side is carried out. When the button 53 is pushed at the side of W, by means of the work piece 55c of the change over member 55 the contact piece 95b of the switch 95 is brought in contact with the contact piece 95a, whereby in the same way as above the motor Mz starts to run while at the same time by means of the bearing part 55c of the change over member 55 the support plate 63 is rotated along the clockwise direction around the shaft 84, whereby the gear 52 at the end of the rotary shaft 17 engages with the gear 50 so that the cam ring 3b is driven along the reversed direction of the above mentioned case by means of the gears 88 and 89, the rotary shaft 17 and gears 52 and 50 in such a manner that the zooming toward the WIDE ANGLE side is carried out.

(OPERATION AT THE TIME OF AUTOMATIC PHOTOGRAPHY BY MEANS OF THE SELF-TIMER)

When in the same way as in case of the above mentioned embodiment the timer operation dial (FIG. 1) is rotated along the clockwise direction until the index 20b is located within the indication zone 2c of the side plate 2, as mentioned above with the charging of the spring 44, the opening of the switch 42, the release of the engagement of the gear 9 by means of the holding lever 6 and the closing of the switch 7, the slide member 37 is moved upwards in the drawing, whereby by means of the work piece 37e of the slide member 37 the contact piece 90b of the switch 90 is brought in contact with the contact 90a in such a manner that the self-timer device is set for the automatic photography (FIG. 4).

Figure 6:
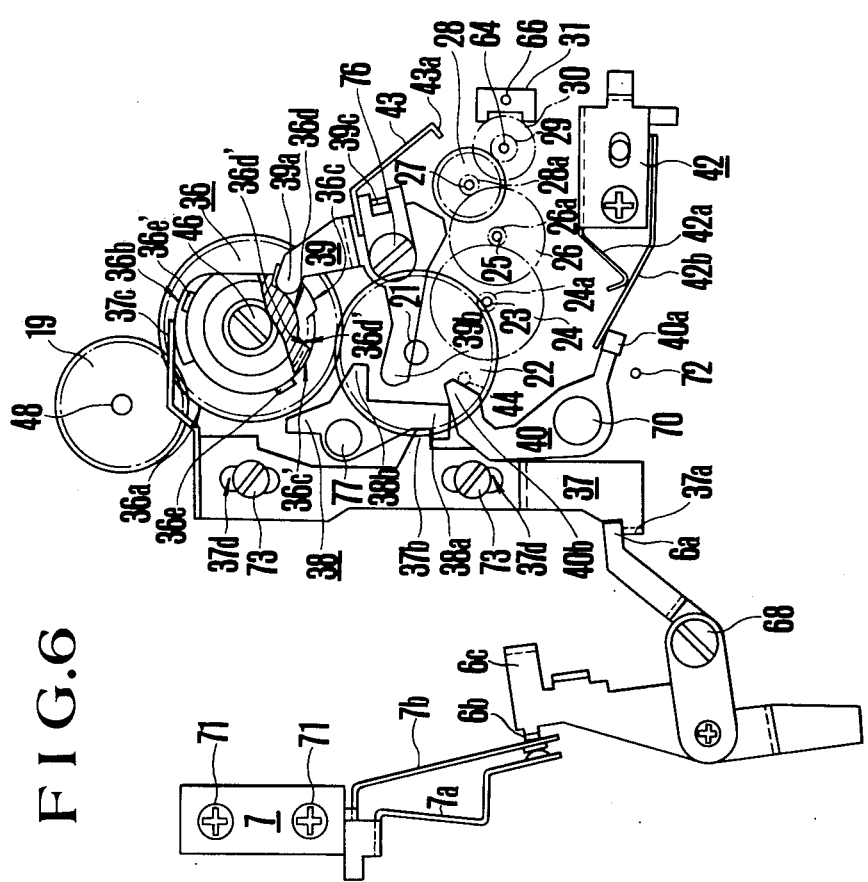

When in this state in the same way as above, the control member 36 is pushed inside against the force of the spring 49 so as to be changed from the gear 22 over to the gear 19, the locking of the gear 28 by means of the claw part 43a of the plate spring 43 is released and the first timer means is driven by the spring 45 as driving source in order to determine the waiting time (FIG. 5), whereby after the elapse of a certain determined time the swing lever 40 closes the switch 42 (FIG. 6).

Thus the current supply circuits for the motors M and Mz are established at the same time so as to drive the motors M and Mz, whereby by means of the motor M the shutter 62 is driven to carry out photographing while the driving power of the motor Mz is transmitted to the control member 36 through the gears 88 and 89, the rotary shaft 17, the worm gear 18, the worm wheel 19 and the gear part 36a so that the control member 36 starts to run in order to determine the photographing time (FIG. 7).

When a certain determined time has passed, the engagement of the slide member 37 is released so as to move sliding downwards, whereby the switch is opened so as to stop the motor Mz while the holding lever 6 being freed, the holding claw 6c of the holding lever 6 engages with the stopper parts 9a of the gear 9, whereby the switch 7 is opened so as to stop the motor M and terminate the photographing. At this time by means of the force of the spring 49 the control member 36 is returned to the initial position at which the member 36 is functionally engaged with the gear 22 and therefore by operating as mentioned above the automatic photography by means of the self-timer can be repeated.

Thus in the present embodiment the second timer means in the self-timer device is driven by the zooming motor Mz as driving source, as compared with the afore-mentioned embodiment it is possible to prevent the increase of the load on the shutter driving motor M due to the provision of the self-timer device, which is quite profitable.

In the embodiment shown in FIGS. 13 and 14, the zooming motor Mz is used as the driving source, whereby it goes without saying that other additional motor can also do well.

What is claimed is:
1. A self-timer device for a camera equipped with a driving motor for enabling automatic photography, comprising:
 A. timer means for controlling a first time interval until the initiation of picture-taking operation, said timer means having a spring means capable of charging by manual operation and operating to control said first time interval by the force which is charged in said spring means;
 B. first operation means for the initiation of the picture-taking operation, said first operating means being operatively associated with said timer means and initiating the picture-taking operation by energizing said driving motor when said first time interval elapsed;
 C. manually operable means concurrently applied to the charging of said spring means and to the controlling of a second time interval until the termination of the picture-taking operation subsequent to said first time interval, said manually operable means being shiftable between a first state operatively connected with said timer means and a second state operatively connected with said driving motor and, in said first state, said manually operable means being applied to the charging of said spring means by manual operation, while in said second state, said manually operable means operating to control said second time interval by the driving force of said driving motor upon the energization of said driving motor; said spring means being charged by manual operation to said manually operable means when said manually operable means is in said first state; said timer means initiating the operation for controlling said first time interval by the force which is charged in said spring means when said manually operable means is shifted from said first state to said second state by manual operation under the state that said spring means is charged; said manually operable means initiating the operation for controlling said second time interval by the driving force of said driving motor when said motor is energized by said first operating means after the lapse of said first time interval under the state wherein said manually operable means is shifted to said second state; and
 D. second operating means to stop the picture-taking operation, said second operating means being operatively associated with said manually operable means and stopping the picture-taking operation by de-energizing said driving motor when said second time interval elapsed.

2. A self-timer device according to claim 1, wherein said camera further has a trigger switch electrically connected with said driving motor and manually operable from outside the camera; said self-timer device further comprising an auxiliary switch connected in series with said trigger switch; said first operating means being capable of controlling said auxiliary switch in connection with the operation of said timer means, and after opening said auxiliary switch upon charging of said spring means, closing said auxiliary switch so as to initiate the picture-taking operation when said first time interval has elapsed; said second operating means being capable of controlling said trigger switch in connection with the operation of said manually operable means, and after closing said trigger switch by manual operation to said manually operable means so as to charge said spring means, opening said trigger switch to stop the picture-taking operation when said second time interval has elapsed.

3. A self-timer device according to claim 2, wherein said second operating means includes an actuating means for closing said trigger switch in connection with the operation of said manually operable means, said actuating means being operatively associated with said manually operable means and closing said trigger switch by manual operation to said manually operable means so as to charge said spring means; a locking means for locking said actuating means at the closed position of said trigger switch; and a release means for releasing the locking of said actuating means by said locking means in connection with the operation of said manually operable means, said release means being operatively associated with said manually operable means and releasing the locking of said actuating means by said locking means when said second time interval has elapsed, said actuating means opening said trigger switch when the locking due to said locking means is released by said release means.

4. A self-timer device according to claim 3, wherein said manually operable means includes a first control portion for controlling said actuating means, said actuating means being set at a position to close said trigger switch by said first control portion upon manual operation to said manually operable means so as to charge said spring means; and a second control portion for controlling said release means, said release means stopping the picture-taking operation by releasing the locking of said actuating means due to said locking means when said second time interval has elapsed under the control by said second control portion.

5. A self-timer device according to claim 4, further comprising urging means for keeping said manually operable means in said first state; said manually operable means further having a projected portion formed along said second control portion; said release means being capable of keeping said manually operable means in said second state against the urging force of said urging means by engaging with said projected portion when said manually operable means is shifted from said first state to said second state against the urging force of said urging means by manual operation, and when operated so as to release the locking of said actuating means due to said locking means by said second control portion of the manually operable means after the lapse of said second time interval, said release means being disengaged from said projected portion so as to release the keeping of said manually operable means in said second state; said manually operable means being automatically restored to said first state by the urging force of said urging means when the maintenance in said second state due to said release means is released.

6. A self-timer device according to claim 5, further comprising latching means for latching said timer means in an inactive state against the energizing force of said spring means when the charging of said spring means terminated, said latching means being connected with said release means, and when said manually operable means is shifted from said first state to said second state and said release means engages with said projected portion of the manually operable means so as to maintain said manually operable means in said second state, said latching means releasing the latching of said timer means in response to said operation; said timer means initiating operation for controlling said first time interval by the charged force charged in the spring means when the latching due to said latching means is released.

7. A self-timer device according to claim 6, wherein said manually operable means further includes a third control portion for controlling said latching means, said third control portion being formed on a part of said projected portion, and when the charging of said spring means has terminated, said third control portion actuating the latching means through said release means so as to latch said timer means in the inactive state.

8. A self-timer device according to claim 1, further comprising urging means for keeping said manually operable means in said first state, said manually operable means being maintained in said first state by the urging force of said urging means as well as capable of being shifted to said second state against the urging force of said urging means; and arresting means for movably arresting said manually operable means in said second state when said manually operable means is shifted to said second state, said arresting means being operatively associated with said manually operable means and releasing the arresting of said manually operable means when said second time interval has elapsed, said manually operable means being automatically restored to said first state by the urging force of said urging means when the arresting due to said arresting means is released, said second operating means being operatively associated with said arresting means and de-energizing said driving motor so as to stop the picture-taking operation in response to the operation said arresting means when said arresting means releases the arresting of said manually operable means.

9. A self-timer device according to claim 8, wherein said manually operable means being provided with a control portion for releasing the arresting of said manually operable means due to said arresting means when said second time interval has elapsed, said arresting means being operatively associated with said control portion, and the arresting of said manually operable means being released by said control portion synchronizing with the lapse of said second time interval during the course that said manually operable means is driven by said driving motor.

10. A self-timer device according to claim 9, wherein said camera further has a trigger switch electrically connected with said driving motor and operable manually from outside the camera; said self-timer device further comprising an auxiliary switch connected in series with said trigger switch; said first operating means being capable of controlling said auxiliary switch in connection with the operation of said timer means, and after opening said auxiliary switch upon charging of said spring means, closing said auxiliary switch so as to initiate the picture-taking operation when said first time interval has elapsed; said second operating means being capable of controlling said trigger switch in connection with the operation of said manually operable means and said arresting means, and after closing said trigger switch by manual operation to said manually operable means for charging said spring means, opening said trigger switch so as to stop the picture-taking operation when said arresting means is actuated so as to release the arresting of said manually operable means after the lapse of said second time interval.

11. A self-timer device according to claim 10, wherein said second operating means includes an actuating means for closing said trigger switch in connection with the operation of said manually operable means, said actuating means being operatively associated with said manually operable means and closing said trigger switch by manual operation to said manually operable means so as to charge said spring means; a locking means for locking said actuating means at a position where said trigger switch is closed; and a release means for releasing the locking of said actuating means due to said locking means in connection with the operation of said arresting means, said release means being connected with said arresting means and releasing the locking of said actuating means due to said locking means when said arresting means is actuated so as to release the arresting of said manually operable means after the lapse of said second time interval, said actuating means opening said trigger switch so as to stop the picture-taking operation when the locking due to said locking means is released by said release means.

12. A self-timer device according to claim 11, further comprising latching means for latching said timer means in an inactive state against the energizing force of said spring means when the charging of said spring means terminated, said latching means being connected with said arresting means, and when said manually operable means is shifted from said first state to second second state and said arresting means arrests said manually operable means in said second state, said latching means releasing the latching of said timer means; said timer means initiating the operation for controlling said first timer interval by the charged force charged in the spring means when the latching due to said latching means is released.

13. A motion picture camera comprising:
A. a driving motor;
B. a switch circuit for controlling the starting and stopping of said driving motor, said circuit being electrically connected with the motor and having first and second switches connected in series with each other;
C. first means acting upon said first switch;
D. second means acting upon said second switch;
E. third means for determining a first time interval until the initiation of picture-taking operation, said third means having a spring means and operating by the charged force charged in the spring means so as to determine the first time interval;
F. manually operable fourth means adapted for charging said spring means in said third means as well as for determining a second time interval until the termination of the picture-taking operation, said fourth means being shiftable between a first state in which the fourth means is operatively connected with the third means and adapted for charging the spring means by manual operation from outside the camera, and a second state in which the fourth means is operatively connected with said driving motor and driven by the motor so as to determine the second time interval when the motor is started; said spring means in the third means being charged through said fourth means by manual operation for charging the spring means from outside the camera to said fourth means when the fourth means is in said first state; said third means starting its operation for determining the first time interval by the charged force charged in the spring means when the fourth means is shifted to the second state from the first state by the manual operation from outside the camera; said second means being operatively associated with the third means and actuating said second switch so as to start the driving motor after the lapse of said first time interval; said fourth means initiating its operation for determining the second time interval by the driving force of said driving motor when the driving motor is started after the lapse of said first time interval under the state that said fourth means is shifted to the second state; said first means being operatively associated with the fourth means and actuating said first switch so as to stop the driving motor after the lapse of said second time interval; thereby automatic picture-taking is enabled.

14. A motion picture camera according to claim 13, wherein said first means includes: an actuating means for closing said first switch in connection with the operation of said fourth means, said actuating means being operatively associated with said fourth means to close said first switch by manual operation for said fourth means so as to charge said spring means; a locking means to lock said actuating means at a position where said first switch is closed; a release means for releasing the locking of said actuating means due to said locking means in connection with the operation of said fourth means, said release means being operatively associated with said fourth means and releasing the locking of said actuating means due to said locking means when said second time interval has elasped, said actuating means opening said first switch so as to stop said driving motor when the locking due to said locking means is released by said release means, said second means opening said second switch in connection with the operation of said third means upon the charging of said spring means and then closing the second switch so as to start said driving motor when said first time interval has elapsed.

15. A motion picture camera according to claim 14, wherein said manually operable fourth means is provided with a first control portion for controlling said actuating means, said actuating means being set at a position to close said first switch by said first control portion upon manual operation for said fourth means so as to charge said spring means; and a second control portion and releasing the locking of said actuating means due to said locking means when said second time interval has elapsed.

16. A motion picture camera according to claim 15, further comprising urging means for keeping said manually operable fourth means in said first state; said manually operable fourth means further provided with a projected portion formed along said second control portion, said release means being engageable with said projected portion and capable of keeping said fourth means in said second state against the urging force of said urging means when said fourth means is shifted from said first state to said second state by manual operation against the urging force of said urging means, and being disengaged from said projected portion so as to release the maintenance of said fourth means in said second state when operated so as to release the locking of said actuating means due to said locking means by said second control portion of the fourth means after the lapse of said second time interval, said manually operable fourth means being automatically restored to said first state by the urging force of said urging means when the maintenance in said second state due to said release means is released.

17. A motion picture camera according to claim 16 further comprising latching means for latching said third means in an inactive state against the energizing force of said spring means when the charging of said spring means has terminated, said latching means being connected with said release means and releasing the latching of said third means when said release means engages with said projected portion of the fourth means to keep the same in said second state upon the shifting of said fourth means from said first state to said second state, said third means initiating the operation for controlling said first time interval by the charged force charged in the spring means when the latching due to said latching means is released.

18. A motion picture camera according to claim 17, wherein said manually operable fourth means is further provided with a third control portion for controlling said latching means, said third control portion being formed on a part of said projected portion and actuating said latching means through said release means so as to latch said timer means in the inactive state when the charging of said spring means has terminated.

19. A motion picture camera according to claim 13, further comprising urging means for keeping said manually operable fourth means in said first state, said fourth means being maintained in said first state by the urging force of said urging means as well as being able to be shifted to said second state by manual operation against the urging force of said urging means; and arresting means for movably arresting said fourth means in said second state when said fourth means is shifted to said second state, said arresting means being operatively associated with said fourth means and releasing the arresting of said fourth means when said second time interval elapsed, said fourth means being automatically restored to said first state by the urging force of said urging means when the arresting due to said arresting means is released, said first means being operatively connected with said arresting means and actuating said first switch so as to stop said driving motor in response to the operation when said arresting means releases the arresting of said fourth means.

20. A motion picture camera according to claim 19, wherein said manually operable fourth means is provided with a control portion for releasing the arresting of said manually operable means due to said arresting means when said second time interval has elapsed, said arresting means being operatively associated with said control portion, and the arresting of said fourth means being released by said control portion synchronizing with the lapse of said second time interval during the course that said fourth means is driven by said driving motor.

21. A motion picture camera according to claim 20, wherein said first means includes an actuating means for closing said first switch in connection with the operation of said fourth means, said actuating means being operatively associated with said fourth means and closing said first switch by manual operation for said fourth means to charge said spring means; a locking means for locking said actuating means at a position where said first switch is closed; and a release means for releasing the locking of said actuating means due to said locking means in connection with the operation of said arresting means, said release means being connected with said arresting means and releasing the locking of said actuating means due to said locking means when said arresting means is actuated so as to release the arresting of said fourth means when said second time interval has elapsed, said actuating means opening said first switch so as to stop said driving motor when the locking due to said locking means is released by said release means, said second means opening said second switch in connection with the operation of said third means upon the charging of said spring means and then closing the second switch so as to start said driving motor when said first time interval has elapsed.

22. A motion picture camera according to claim 21, further comprising latching means for latching said third means in an inactive state against the energizing force of said spring means when the charging of said spring means has terminated said latching means being connected with said arresting means and releasing the latching of said third means when said arresting means arrests said fourth means in said second state upon the shifting of said manually operable fourth means from said first state to said second state, said third means initiating the operation for controlling said first time interval by the charge force charged in the spring means when the latching due to said latching means is released.

23. A motion picture camera comprising:
A. shutter means rotatingly operated for opening a picture-taking window intermittently;
B. a driving motor for driving said shutter means, said motor being operatively connected with the shutter means;
C. a trigger switch for controlling the starting and stopping of said driving motor, said trigger switch being electrically connected with the driving motor and operable manually from outside the camera;
D. an auxiliary switch connected in series with said trigger switch;
E. timer means for determining a first time interval until the initiation of picture-taking operation, said timer means having a spring means which is chargeable by manual operation from outside the camera, and the timer means operating by the force charged in the spring means so as to determine the first time interval;
F. manually operable means adapted for charging said spring means from outside the camera as well as for determining a second time interval until the termination of the picture-taking operation, said manually operable means being shiftable between a first state in which the manually operable means is operatively connected with said timer means and adapted for charging the spring means by the manual operation from outside the camera, and a second state in which the manually operable means is operatively connected with said driving motor and driven by the motor so as to determine the second time interval when the motor is energized; said spring means being charged through said operable means by manual operation for charging the spring means from outside the camera to said operable means when said manually operable means is in said first state; said timer means starting its operation for determining said first time interval by the charged force charged in the spring means when said manually operable means is shifted to said second state from said first state;

G. first actuating means acting upon said auxiliary switch, said first actuating means is operatively associated with said timer means, and after turning the auxiliary switch off upon the charging of said spring means, turning the auxiliary switch on so as to energize said driving motor when said first time interval has elapsed during the operating course of the timer means;

H. second actuating means acting upon said trigger switch, said second actuating means being operatively associated with said manually operable means and turning the trigger switch on upon manual operation to said operable means so as to charge said spring means; and I. locking means for locking said second actuating means at a position where said trigger switch is turned on, said locking means being operatively associated with said manually operable means, and after locking the second actuating means when said operable means is shifted to said second state, releasing said locking when said second time interval has elapsed during the course that said operable means is driven by said driving motor; said second actuating means turning said trigger switch off so as to de-energize said driving motor when the locking due to said locking means is released.

24. A motion picture camera according to claim 23, further comprising urging means for keeping said manually operable means in said first state, said manually operable means being kept in said first state by the urging force of said urging means, as well as being shiftable to said second state by manual operation from outside the camera against said urging force of said urging means; and arresting means movably arresting said manually operable means in said second state, said arresting means being operatively associated with said manually operable means and after arresting said operable means when said operable means is shifted from said first state to said second state, releasing said arresting when said second time interval has elapsed during the course that said operable means is driven by said driving motor, said manually operable means being automatically restored to said first state by the urging force of said urging means when the arresting due to said arresting means is released, said locking means being operatively associated with said arresting means, and after locking said second actuating means in response to the operation when said arresting means arrests said manually operable means, releasing the locking of said second actuating means in response to the operation when said arresting means releases the arresting of said operable means.

25. A motion picture camera comprising:
A. shutter means rotatingly operated for opening picture-taking window intermittently;
B. a driving motor for driving said shutter means, said motor being operatively connected with the shutter means;

C. a trigger switch for controlling the starting and stopping of said driving motor, said trigger switch being electrically connected with the driving motor and operable manually from outside the camera;

D. an auxiliary switch connected in series with said trigger switch;

E. timer means for determining a first time interval until the initiation of picture-taking operation, said timer means having a spring means which is chargeable by manual operation from outside the camera, and the timer means operating by the force charged in the spring means so as to determine the first time interval;

F. manually operable means adapted for charging said spring means from outside the camera as well as for determining a second time interval until the termination of the picture-taking operation, said manually operable means being shiftable between a first state in which the manually operable means is operatively connected with said timer means and adapted for charging the spring means by the manual operation from outside the camera, and a second state in which the manually operable means is operatively connected with said driving motor and driven by the motor so as to determine the second time interval when the motor is energized;

G. urging means for keeping said manually operable means in said first state, said manually operable means being kept in said first state by the urging force of said urging means, as well as being shiftable to said second state by manual operation from outside the camera against the urging force of said urging means;

H. arresting means for movably arresting said manually operable means in said second state, said arresting means being operatively associated with said manually operable means, and after arresting said operable means when said operable means is shifted from said first state to said second state, releasing said arresting when said second time interval has elapsed during the course that said operable means is driven by said driving motor; said manually operable means being automatically restored to said first state by the urging force of said spring means when the arresting due to said arresting means is released; said spring means being charged through said operable means by manual operation for charging the spring means from outside the camera to said operable means when said manually operable means is in said first state; said timer means starting its operation for determining said first time interval by the force charged in the spring means when said manually operable means is shifted to said second state from said first state;

I. first output means acting upon said auxiliary switch, said first output means being operatively associated with said timer means, and after turning said auxiliary switch off upon the charging of said spring means, turning the auxiliary switch on so as to energize said driving motor as said first time interval elapsed during the operation of the timer means; and J. second output means acting upon said trigger switch, said second output means being operatively associated with said manually operable means and said arresting means, and after turning the trigger on upon manual operation for the manually operable means so as to charge said spring means, turning the trigger switch off so as to deenergize said driving motor in response to the operation of said arresting means when said arresting means releases the arresting of the manually operable as said second time interval has elapsed.

26. A motion picture camera comprising:
A. shutter means rotatingly operating to open a picture-taking window intermittently;
B. a driving motor for driving said shutter means, said motor being operatively coupled with the shutter means;
C. a trigger switch electrically coupled with said driving motor;
D. an auxiliary switch connected in series with said trigger switch;
E. stopper means for stopping said shutter means at a position where said shutter means closes said picture-taking window, said stopper means being manually operable from outside the camera, as well as further operatively associated with said trigger switch, so that when the shutter means is stopped at said position, the trigger switch is turned off, and when the stopping of the shutter means is released, the trigger switch is turned on;
F. timer means for determining a first time interval until the initiation of picture-taking operation, said timer means having a spring means which is chargeable by manual operation from outside the camera, the timer means operating by the force charged in the spring means so as to determine the first time interval;
G. manually operable means adapted for charging said spring means from outside the camera as well as for determining a second time interval until the termination of the picture-taking operation, said manually operable means being shiftable between a first state in which the manually operable means is operatively connected with said timer means and adapted for charging the spring means by the manual operation from outside the camera, and a second state in which the manually operable means is operatively connected with said driving motor and driven by the motor so as to determine the second time interval when the motor is energized;
H. urging means for maintaining said manually operable means in said first state; said manually operable means being maintained in said first state by the urging force of said urging means, as well as being shiftable to said second state by manual operation from outside the camera, against the urging force of said urging means;
I. arresting means for movably arresting said manually operable means in said second state, said arresting means being operatively associated with said manually operable means, and after arresting said operable means when said operable means is shifted from said first state to said second state, releasing said arresting when said second time interval has elapsed during the course that said operable means is driven by said driving motor; said manually operable means being automatically restored to said first state by the urging force of said urging means when the arresting due to said arresting means is released; said spring means being charged through said operable means by manual operation for charging the spring means from outside the camera to said operable means when said manually operable means is in said first state; said timer means starting its operation for determining said first time interval by the force charged in the spring means when said manually operable means is shifted to said second state from said first state;
J. first actuating means acting upon said auxiliary switch, said first actuating means being operatively associated with said timer means, and after making said auxiliary switch turn-off upon charging of said spring means, making the auxiliary switch turn-on so as to energize said driving motor when said first time interval has elapsed during the course of operation of the timer means;
K. second actuating means acting upon said stopper means, said second actuating means being operatively associated with said manually operable means, and releasing the stopping of said shutter due to the stopper means upon manual operation to said operable means so as to charge said spring means; and
L. locking means for locking said second means at a position where the stopping of said shutter means by said stopper means is released, said locking means being operatively associated with said arresting means, and after locking said second actuating means in response to the operation of said arresting means when said arresting means arrests said manually operable means, releasing the locking of said second actuating means in response to the operation of said arresting means when said arresting means releases the arresting of said operable means; said stopper means de-energizing said driving motor by stopping said shutter means as well as by making said trigger switch turn off.

* * * * *